Aug. 20, 1946.  A. C. McCRUM  2,405,972
METHOD OF PRODUCING PRESCRIPTION BLANKS
Filed Jan. 13, 1945  3 Sheets-Sheet 2

INVENTOR
Arthur C. McCrum
BY Thos. E. Scofield
ATTORNEY

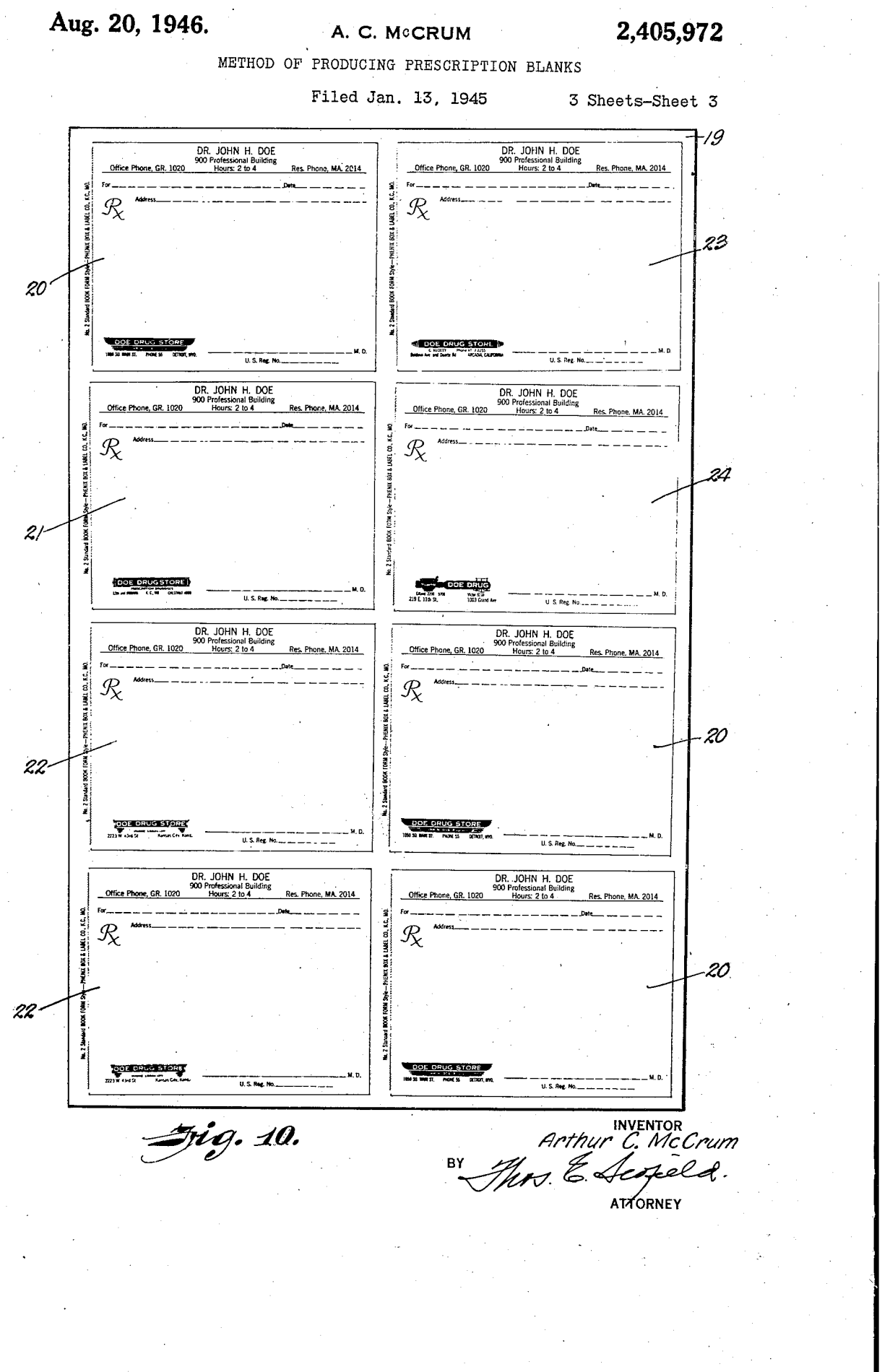

Aug. 20, 1946.  A. C. McCRUM  2,405,972
METHOD OF PRODUCING PRESCRIPTION BLANKS
Filed Jan. 13, 1945  3 Sheets-Sheet 3

Fig. 10.

INVENTOR
Arthur C. McCrum
BY
ATTORNEY

Patented Aug. 20, 1946

2,405,972

UNITED STATES PATENT OFFICE 2,405,972

METHOD OF PRODUCING PRESCRIPTION BLANKS

Arthur C. McCrum, Kansas City, Mo.

Application January 13, 1945, Serial No. 572,662

5 Claims. (Cl. 95—5)

This invention relates to improvements in a method of producing prescription blanks used by doctors, druggists and hospitals and refers more particularly to a procedure employing a sequence of steps of photographic reproduction and printing from offset plates whereby blanks may be quickly and economically produced eliminating the conventional expensive typesetting, resetting and type distributing operations.

It is common practice in the medical profession for doctors to write prescriptions on different drug stores according to the type of the particular store and to accommodate the patients' convenience. Also, druggists and hospitals prefer prescription blanks originating from or written on their establishments to have identifying indicia conforming with the title designs used on the labels applied to their bottles and boxes. This practice not only affords easier reference to the source of prescription, but also provides advantages from an advertising standpoint.

To print prescription blanks it has been necessary to set up an individual type form for each doctor, drugstore and hospital and print the blanks from these forms. When the druggists wish to furnish physicians with their prescription blanks separate forms must be set up for the individual doctors and the individual drugstores.

An object of the invention, therefore, is to provide a simple and more economic method of making prescription blanks.

Another object is to provide a procedure for simultaneously printing a greater number and variety of prescription blank types with considerably less labor and expense.

A further object is to provide a method by which lettering and design indicia are rendered more distinct, sharper in outline and more attractive in appearance.

Other and further objects will appear from the following description.

Figure 4:
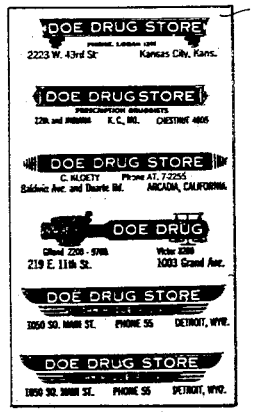
Figure 5:
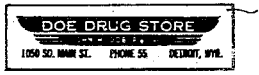
Figure 9:
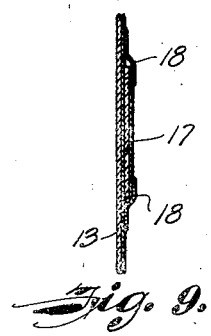
Figure 7:
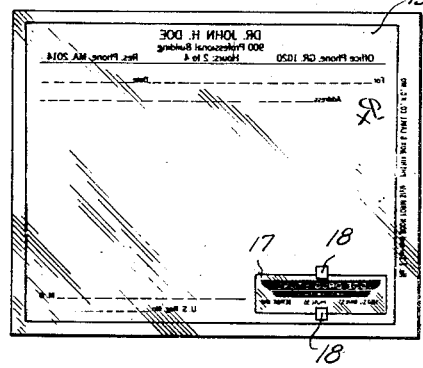
Figure 8:
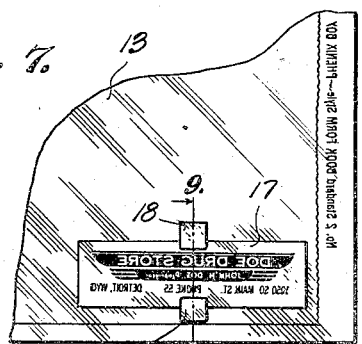
Figure 11:
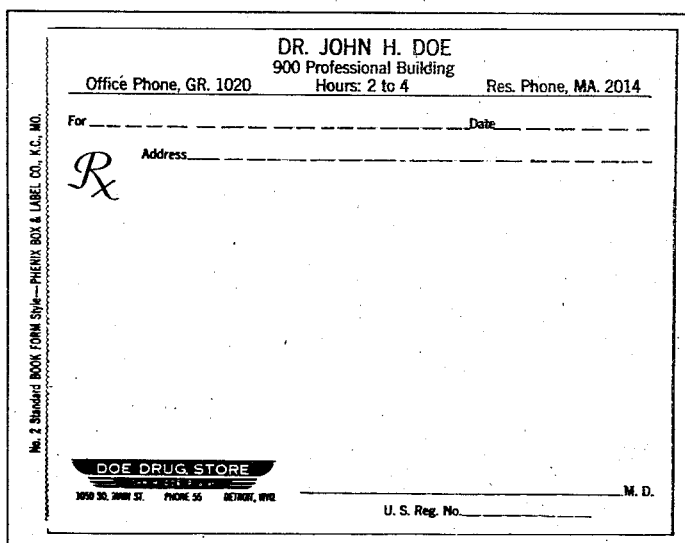

In the accompanying drawings which form a part of the instant specification and are to be read in conjunction therewith, and in which like reference numerals are used to indicate like parts in the various views, Fig. 1 shows a prescription blank form, Fig. 2 is a strip which is pasted or otherwise applied at the top of the prescription form and upon which appears the doctor's card, Fig. 3 is a photographic negative of the form shown in Fig. 1, Fig. 4 is a group of different druggist's title designs, Fig. 5 is a selected druggist's title design for use on the prescription blank, Fig. 6 is a photographic negative of the selected title design shown in Fig. 5 of a size to fit the window opening in the negative shown in Fig. 3, Fig. 7 is a negative paste-up of the prescription blank form negative of Fig. 3 and the title design negative of Fig. 6, Fig. 8 is an enlarged detail of a corner of the negative paste-up shown in Fig. 7, Fig. 9 is a cross sectional view taken on the line 9—9 in Fig. 8 in the direction of the arrows, Fig. 10 is a sheet of prescription blanks reduced in size which were printed from an offset plate and upon which appear three facsimiles of the negative paste-up shown in Fig. 7, Fig. 11 is the printed prescription blank shown in actual size when cut from the sheet shown in Fig. 10.

A brief résumé of the procedural steps of the method will aid in an understanding of its features and advantages. The method comprises preparing a negative paste-up from photographic reproductions of a prescription blank form and a title design. A plurality of these negative paste-ups are then arranged upon a masking out glass and an offset plate made in the conventional manner upon a light sensitized printing plate. After etching, this plate is used on a press for printing the prescription blanks. That part of the process subsequent to the making of the negative paste-ups is conventional in offset printing and forms no part of the present invention.

In Fig. 1 of the drawings at 10 is shown a prescription blank form, in the lower left-hand corner of which is a black panel 11. The positioning of this panel is more or less arbitrary according to the desired placing of the title design which is to take the place of the panel as will be hereinafter explained. Upon a flexible strip 12, preferably made of white paper with gum or adhesive applied to the back, is printed the doctor's card or any indicia which is to be placed as a heading on the top of the prescription form. This strip is then applied along the top margin of the prescription form 10. The form with the strip applied thereto is designated as a paste-up. A photograph is taken of the paste-up and when developed results in the negative 13 shown in Fig. 3. Note that the black panel 11 on the prescription blank becomes a transparent window 14 in the negative. From a large stock of title designs, produced according to my Patent 2,279,949, a few of which are shown in the strip designated by the numeral 15 in Fig. 4 there is selected a single title design of the customer for whom the prescription blanks are to be made. A single facsimile of this title design is cut from the strip as shown at 16 in Fig. 5. A photograph is taken of this title design reduced to a size which will fit in the window opening of the negative 13. The photographic negative of the title design 16 is shown at 17 in Fig. 6.

A paste-up is then made of the prescription blank negative 13 and the title design negative 17 by placing the title design negative in the transparent window 14 of the negative and attaching the title design negative to the prescription blank form by adhesive strips of transparent tape, such as cellulose Scotch tape. When placing the title design negative in the window of the prescription form negative the emulsion sides or faces of the two negatives should be made to correspond. Up to this point in the process the sequence of steps in the preparation of the paste-up negative constitute the new and original steps in the process and those which follow are conventional to offset printing. When a number of these negative paste-ups have been prepared they are attached to a masking out glass in columns and spaced to be easily cut after printing. The masking out glass with the negatives attached thereto is then placed in a frame and a light sensitive plate placed against the glass and the frame containing the negatives and the light sensitive plate exposed to a brilliant light for a time period sufficient to reproduce the subject matter of the negatives upon the light sensitive plate. The plate is then etched in the conventional manner and the prescription blanks printed from the offset plate on an offset printing press.

In order to obtain sharper contour of both the printed indicia and design features it is contemplated and has been found preferable to have the original prescription blank form 10 and the strip 12 containing the doctor's card of somewhat larger size than the negative 13 which is produced therefrom. The photographic reduction of the paste-up produces a distinctness and clarity in the negative of both the printing and title design figures that cannot be obtained in a conventional printing operation.

After the offset plate has been made the plate is clamped into an offset press and a sheet printed such as that shown at 19 in Fig. 10. Upon this sheet are to be found three of the prescription blanks produced from paste-up negatives 13 and 17. These prescriptions are designated by the numeral 20 and are located on the sheet in the upper left-hand corner and two vertically arranged in the lower right-hand corner. Note that on this sheet 19 are prescriptions made from paste-up negatives of the same doctor but of different drugstores identified by numerals 21, 22, 23. and 24. The druggist's title designs on these other prescription blanks are to be found on strip 15 in Fig. 4. The sheets 19 as they come from the press are stacked, cut and the prescription blanks sorted. Stacking of the sheets as they come from the press and subsequent cutting automatically arranges the prescription blanks in separate piles according to type.

From the foregoing description the simplicity of the procedure is obvious. It requires only facilities for the photographic and offset printing operations. When a druggist wishes to supply a doctor with prescription blanks the manufacturer of the blanks is only required to make a negative paste-up of the prescription form instead of setting up separate printing forms of type and cuts of the title design for each customer. A single prescription form can be used for all druggists and the title design easily replaced by affixing the selected title design negative in the window of the prescription form negative.

The process eliminates time in production of the prescription blanks, expensive labor and produces a clearer and more attractive prescription blank. Since the title designs are on paper strips and can be filed in a small space in a file drawer, storage space required for printing slugs, cuts and printing forms is entirely dispensed with. The method lends itself to many variations in the set-up arrangement of the prescription form and permits change at small expense to the druggist of his title design if desired.

In the event prescription blanks are to be reproduced for druggists or hospitals the top margin of the blank is left plain and only the title design of the druggist or hospital placed in either of the lower corners. The location of the title design is entirely arbitrary as it may be placed anywhere on the blank. Custom and usage, however, have dictated over a long period of time that a more attractive blank is produced by locating the title design in one of the lower corners of the blank.

By reproducing prescription forms for a number of different customers on a single offset plate there may be run simultaneously on an offset printing press a number of different prescription forms making it possible to accommodate the trade more satisfactorily during rush times.

From the foregoing it will be seen that the invention is well adapted to attain the ends and objects hereinbefore set forth together with other advantages which are obvious and which are inherent to the method.

It will be understood that certain features and subcombinations are of utility and may be employed without reference to other features and subcombinations. This is contemplated by and is within the scope of the claims. As many possible embodiments may be made of the invention without departing from the scope thereof it is to be understood that all matter herein set forth or shown in the drawings is to be interpreted as illustrative and not in a limiting sense.

Having thus described my invention, I claim:

1. A method of producing prescription blanks comprising the steps of applying an indicia strip at the top of a prescription blank form said form having a black rectangular panel thereon to produce a paste-up, photographing the paste-up and obtaining a negative having a transparent window resulting from reproduction of the black rectangular panel, photographing a title design to produce a negative corresponding in size to the window in the prescription blank form negative, preparing a paste-up negative by applying the title design negative in the window of the prescription form negative so the emulsion sides of the two negatives correspond, reproducing a plurality of paste-up negatives on an offset plate and printing the prescription blanks from the plates.

2. A method as in claim 1 in which the negative produced from the paste-up is obtained by photographic reproduction.

3. A method of producing a doctor's prescription blank comprising the steps of preparing a paste-up by applying the doctor's card at the top of a blank prescription form which has a black rectangular panel, photographing the paste-up to obtain a negative having a transparent window resulting from reproduction of the black rectangular panel, photographing a druggist's title design and producing a negative corresponding in size to the window in the blank prescription form negative, preparing a paste-up negative by applying the title design negative in the window of the blank prescription form negative so the emulsion sides of the two negatives correspond, reproducing a plurality of the paste-up negatives on an offset plate and printing the blank forms from the plate.

4. A method of producing druggists' prescription blanks comprising the steps of photographing a prescription blank form which has a black rectangular panel and producing a negative having a transparent window formed by reproduction of the black rectangular panel, photographing a druggist's title design to produce a negative corresponding in size to the window in the blank form negative, preparing a paste-up negative by applying the title design negative in the window of the blank form negative so the emulsion sides of the two negatives correspond, reproducing a plurality of paste-up negatives on an offset plate and printing the prescription blanks from the plates.

5. A method of producing hospital prescription blanks comprising the steps of photographing a prescription blank form which has a black rectangular panel adjacent a lower corner and producing a negative having a transparent window formed by reproduction of the black rectangular panel, photographing a hospital title design to produce a negative corresponding in size to the window in the blank form negative, preparing a paste-up negative by applying the title design negative in the window of the blank form negative so the emulsion sides of the two negatives correspond, reproducing a plurality of paste-up negatives on an offset plate and printing the prescription blanks from the plates.

ARTHUR C. McCRUM.